(12) United States Patent
Bargo

(10) Patent No.: US 6,769,512 B2
(45) Date of Patent: Aug. 3, 2004

(54) ACOUSTICAL INSULATION LAMINATE WITH POLYOLEFIN LAYER AND PROCESS FOR MAKING

(75) Inventor: Matthew Bargo, Corbin, KY (US)

(73) Assignee: C.T.A. Acoustics, Corbin, KY (US)

( * ) Notice: Subject to any disclaimer, the term of this patent is extended or adjusted under 35 U.S.C. 154(b) by 5 days.

(21) Appl. No.: 10/237,702

(22) Filed: Sep. 9, 2002

(65) Prior Publication Data

US 2004/0020712 A1 Feb. 5, 2004

Related U.S. Application Data

(60) Provisional application No. 60/400,554, filed on Aug. 2, 2002.

(51) Int. Cl.$^7$ .............................. E04B 1/82; E04B 2/02
(52) U.S. Cl. ...................................... 181/290; 181/286
(58) Field of Search ................................ 181/290, 292, 181/2.84, 286, 288, 294

(56) References Cited

U.S. PATENT DOCUMENTS

| | | |
|---|---|---|
| 3,000,772 A | 9/1961 | Lunn |
| 3,211,253 A | 10/1965 | Gonzalez |
| 3,396,070 A | 8/1968 | Gambill et al. |
| 3,489,639 A | 1/1970 | Spencer |
| 3,991,848 A | 11/1976 | Davis |
| 4,101,704 A | 7/1978 | Hiles |
| 4,315,048 A | 2/1982 | Beghelli et al. |
| 4,441,580 A | 4/1984 | Webster |
| 4,496,024 A | 1/1985 | Wolf et al. |
| 4,926,963 A | 5/1990 | Snyder |
| 4,966,799 A * | 10/1990 | Lucca et al. .................. 428/95 |
| 5,055,341 A * | 10/1991 | Yamaji et al. ............... 428/174 |
| 5,094,318 A * | 3/1992 | Maeda et al. ............... 181/290 |
| 5,108,833 A * | 4/1992 | Noguchi et al. ......... 428/310.5 |
| 5,300,360 A * | 4/1994 | Kocsis et al. ............ 428/304.4 |
| 5,456,513 A * | 10/1995 | Schmidt ..................... 296/39.1 |
| 5,536,556 A * | 7/1996 | Juriga ......................... 428/138 |
| 5,670,235 A * | 9/1997 | Stricker et al. ............. 428/138 |
| 5,681,072 A | 10/1997 | Stricker |
| 5,892,187 A | 4/1999 | Patrick |
| 5,962,594 A | 10/1999 | Raetzsch et al. |
| 5,981,046 A * | 11/1999 | Masui et al. ................. 428/213 |
| 6,109,389 A * | 8/2000 | Hiers et al. .................. 181/290 |
| 6,530,453 B1 * | 3/2003 | Miura et al. ................. 181/292 |
| 2003/0106741 A1 * | 6/2003 | Tompson et al. ........... 181/294 |

* cited by examiner

*Primary Examiner*—Robert Nappi
*Assistant Examiner*—Patrick Miller
(74) *Attorney, Agent, or Firm*—James E. Cole; Middleton Reutlinger

(57) ABSTRACT

An acoustical insulation laminate having a porous polyolefin layer and a process for making the laminate. The laminate preferably includes a porous multiple density polyolefin film, a sound absorbing material and may include a face cloth on one or both sides of the laminate. The porous polyolefin film is preferably disposed between a sound source and the sound absorbing material improving the total noise reduction coefficient of the sound absorbing material alone while reducing the weight of laminates having similar noise reduction capabilities.

44 Claims, 3 Drawing Sheets

ACOUSTICAL INSULATION LAMINATE WITH POLYOLEFIN LAYER AND PROCESS FOR MAKING

CROSS-REFERENCE TO PRIOR APPLICATION

This application claims priority to U.S. Provisional Patent Application Serial No. 60/400,554, filed on Aug. 2, 2002, which is incorporated herein by reference.

BACKGROUND OF THE INVENTION

The present invention relates to an acoustical insulation laminate product and more specifically to an acoustical insulation laminate product comprising an acoustical insulation mat or absorbing material, a polyolefin face, backing, or both, and a front and back face cloth which increase the total noise reduction coefficient.

The use of fiberglass in the manufacturing of acoustical and insulation products is well known. Moreover, insulation materials comprised of fiberglass and organic fibers, including cotton, as well as synthetic or man-made fibers, formed into mats and utilizing a thermo-setting resin have been utilized for many years in the manufacturing of insulation and acoustical products. For example, U.S. Pat. No. 2,689,199 teaches the use of thermoplastic polymers and refractory fibers of glass in the manufacture of a non-woven porous flexible fabric and U.S. Pat. No. 2,695,855 teaches the use of cotton, rayon, nylon or glass fibers with an appropriate resin for a thermal or acoustical insulation material. And, U.S. Pat. No. 4,888,235 teaches a non-woven fibrous product comprising a blended matrix of glass fibers and synthetic fibers having a conductive material of powdered aluminum, copper or carbon black and a thermo-setting resin dispersed in the matrix. However, a number of these insulation products which contain glass fibers and synthetic fibers are generally brittle and are easily broken or cracked when subjected to excessive flexing during installation or use. Moreover, these acoustic insulation products generally absorb high frequencies well but do not absorb low frequencies as well.

There are generally three types of fiberglass which may be used to make the acoustical insulation. The first two types are known as rotary and flame-attenuated fiberglass which are generally formed of about 5 microns or less diameter glass fiber strands, but may exceed 5 microns depending on the application. The third type of fiberglass is typically known as continuous strand or textile fiberglass and generally has a diameter of greater than 5 microns. Comparing the three types, the first two products are typically more expensive to produce, historically have better sound absorption characteristics, but cause more irritation to human skin, are more respirable due to their smaller diameter and therefore are more of a health hazard. And, although the smaller diameter allows for greater density which corresponds to its ability to absorb sound, the smaller diameter results in less durability. On the other hand, the textile fiberglass is typically stronger, more durable, and less hazardous to humans.

Although the fiberglass acoustical insulation and most other sound absorbers typically work well for higher frequency sounds above about 2500 Hz, the lower range frequencies are more difficult to absorb. Frequencies less than about 2500 Hz often pass through known fiberglass acoustical insulations which is highly undesirable in, for instance, an automobile.

Non-porous polyfilms have been used with acoustical absorbing materials in order to absorb limited specific frequencies rather than a wider range of frequencies. However, this is not useful in situations where an enclosure is bombarded by a wide range of acoustical frequencies. Moreover, the polyfilm, which typically absorbs low frequency sounds, dramatically decreases the ability of the sound absorption material to absorb high frequency sounds.

In view of the deficiencies in known acoustical laminates, it is apparent that an acoustical laminate is needed which effectively absorbs both high range frequencies and low range frequencies, is cost effective, lightweight, durable, and stronger than known acoustical absorbing materials.

SUMMARY OF THE INVENTION

It is an object of the present invention to provide an improved acoustical insulation laminate comprising an acoustical insulation mat and a polyolefin film having equal or greater performance than existing absorbing material at a lighter weight.

It is a further object of the present invention to provide an acoustical insulation laminate with a wide range of frequency absorption.

It is yet an even further object to provide an acoustical insulation for automobiles, which are lighter in weight than other acoustic insulations, thereby improving gas mileage and reducing automobile operating expense.

It is still a further object to provide a porous polyfilm in combination with and which enhances known acoustical sound absorbers such as fiberglass, cotton, synthetic, cotton-synthetic blends other acoustical absorbers whether man-made or natural in order to provide an equal or greater range of sound absorption.

It is also an object of the present invention to provide a highly effective sound absorbing laminate using recycled raw materials that are economical to produce.

It is still an even further object of the present invention to provide a polyolefin film having a total flow-through opening of at least 0.25 percent of the surface area of the film, and preferably between 0.25 percent and 50 percent of the surface area of the film.

Even one further object of the present invention is to provide a process for forming the acoustical laminate having a porous polyolefin layer.

More particularly, the acoustical insulation laminate of the present invention includes an insulation mat or absorbing material and a porous polyfilm or polyolefin film. One example of an absorbing material that may be used in the present invention is a fiberglass fibrous material with nylon and a thermo-setting resin co-binder. An example of such a fiberglass mat is set forth in U.S. Pat. No. 5,883,020 issued to Bargo et al. and is incorporated herein by reference.

The instant invention further includes at least one layer of porous polyolefin film or polyfilm affixed to the acoustical insulation mat in order to absorb the lower range frequencies that the acoustical insulation mat typically does not absorb well. The polyfilm typically acts as a barrier to high frequency sounds, however, the porous nature of the polyfilm of the instant invention allows the polyfilm to act as an absorber for low frequency sound, yet allows a wide range of higher frequency sounds to pass through to the absorbing material wherein prior polyfilm laminates have failed. The polyfilm may be a thermo-setting plastic so that the polyfilm thermally bonds to the acoustical insulation mat. Alternatively, the polyfilm may be applied to the acoustical insulation mat with the use of resins, co-polymers, polyesters and other thermoplastic materials. The polyfilm is preferably comprised of a polyolefin, particularly a polypropylene or polyethylene and should be positioned between the sound source and the acoustical insulation mat so that the film resonates against the absorbing material to destroy acoustical energy of the low frequency sound. The polyfilm preferably has a plurality of spaced acoustical flow-through openings allowing high frequency sounds to pass therethrough and be absorbed by the acoustical insulation mat. The surface area of the at least one acoustical flow-through opening may be between 0.25 percent and 50.0 percent. Prior to molding, the acoustical flow-through openings may be circular, square, or any other pre-selected geometric shape including slits. And, upon molding, the polyfilm comprises multiple random shaped apertures having various shapes, sizes, and areas permitting the film to absorb low frequency sounds and permitting high frequency sounds to pass through and be absorbed by the acoustical absorbing material. In operation the polyfilm absorbs low frequency sounds by resonating and destroying acoustical energy while reflecting some high frequency sounds. Other high frequency range sounds passing through the acoustical flow-through openings are absorbed by the acoustical insulation mat. The polyfilm may be used with known rotary, flame-attenuated, or textile fiberglass absorbers as well as other acoustical absorbers in order to enhance their ability to absorb a wide frequency range of sounds.

Finally the acoustical insulation laminate may include a face cloth extending over the film. The face cloth helps retain the laminate together and provides an aesthetically pleasing appearance. The face cloth also affects the amount of distortion of the polyfilm apertures and therefore the performance of the polyfilm.

All of the above outlined objectives are to be understood as exemplary only and many more objectives of the invention may be gleaned from the disclosure herein. Therefore, no limiting interpretation of the objectives noted is to be understood without further reading of the entire specification, claims, and drawings included herewith.

DETAILED DESCRIPTION OF THE PREFERRED EMBODIMENT

Figure 1:
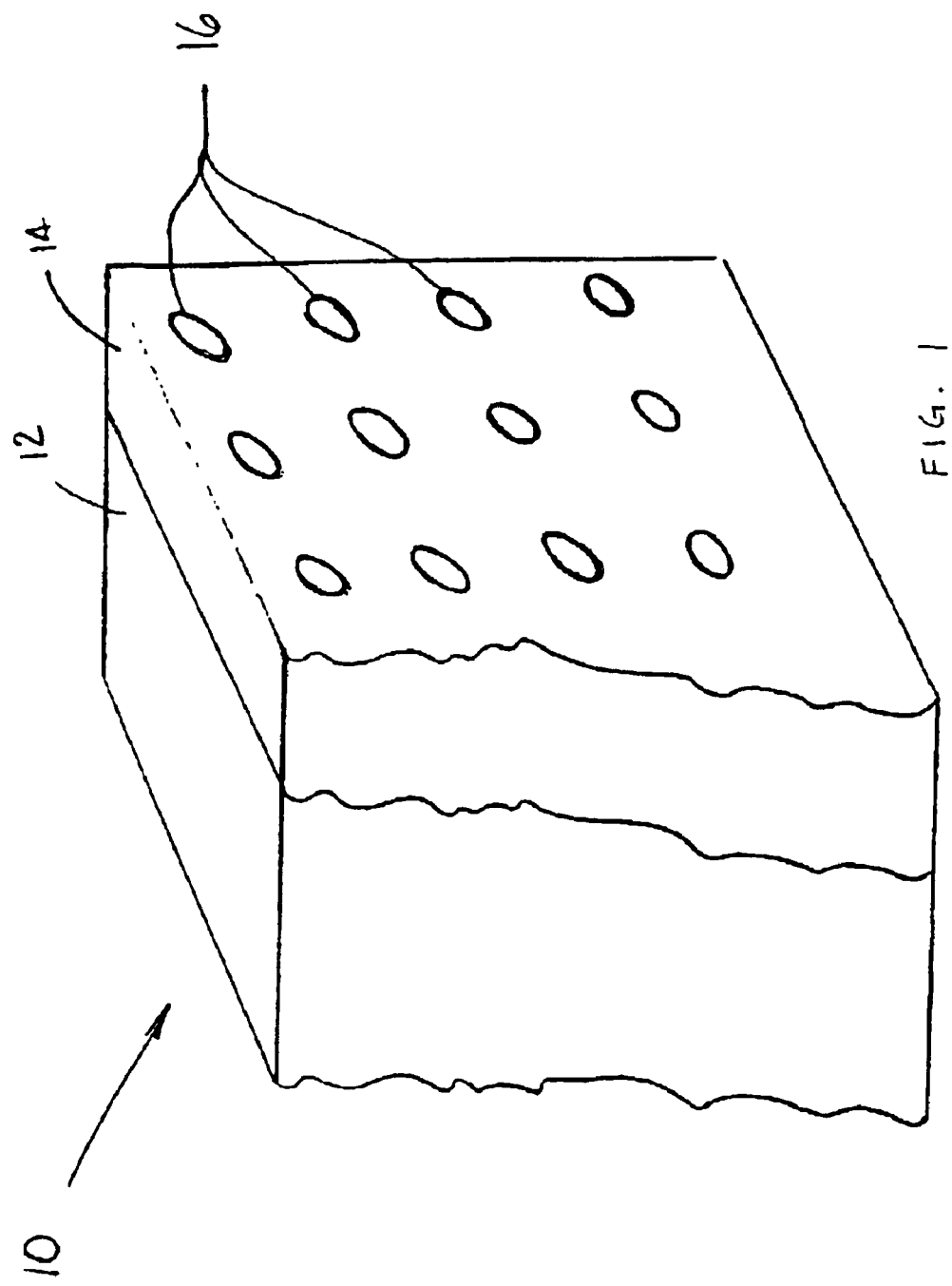
FIG. 1 shows a perspective view of the acoustical insulation laminate of the present invention.
Figure 2:
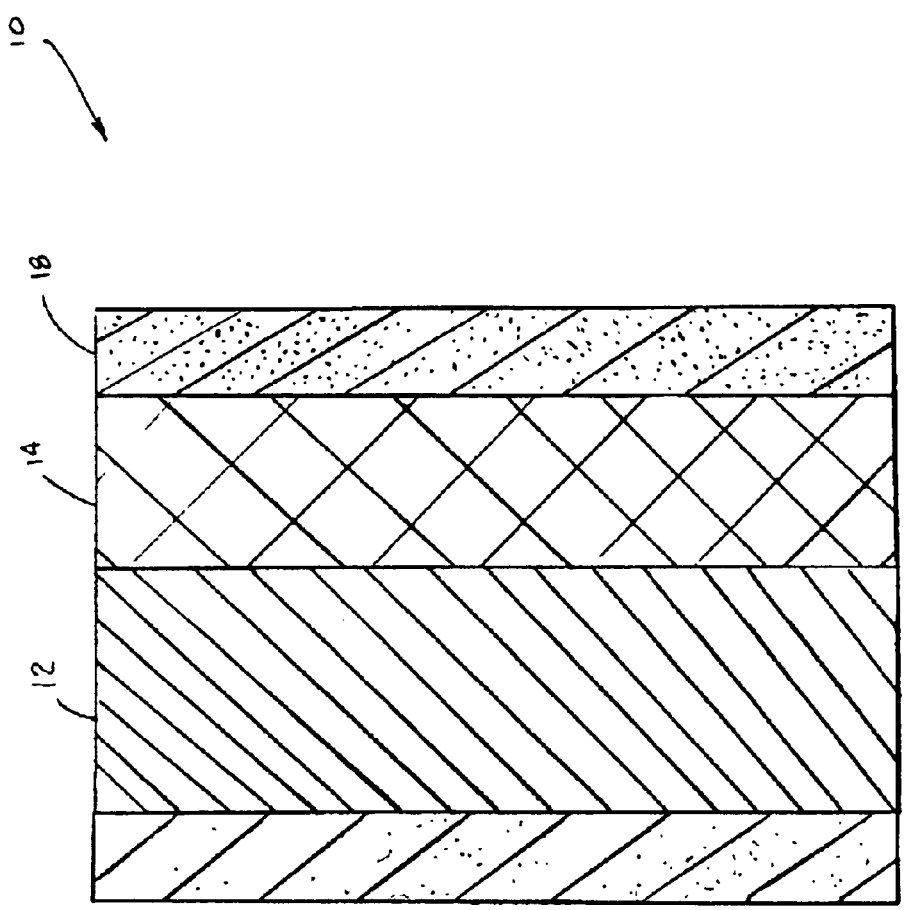
FIG. 2 shows a sectional view of the acoustical insulation laminate of FIG. 1 further including a face cloth; and, FIG. 3 shows a chart display of the absorption coefficient of both a fiberglass acoustic insulation and a fiberglass acoustical insulation with a porous polyolefin film.

In accordance with the present invention as shown in FIGS. 1 and 2, an acoustical insulation laminate 10 is provided herein having at least a front and a rear surface. The acoustical insulation laminate 10 includes an acoustical insulation or sound absorbing material mat 12, a polyolefin film 14 having at least one acoustical flow-through opening 16, and preferably a face cloth 18. The acoustical insulation mat 12 has a front and a rear surface, is preferably formed of fiberglass, and may vary in weight and thickness in order to vary the frequency absorption characteristics. A preferred fiberglass mat will be from 2 mm to 155 mm in thickness and the film will be from about 0.2 mil to 20 mils in thickness. Moreover, the cross-sectional area of the openings 16, prior to molding, will be from 0.10 to 25.4 millimeters square (mm$^2$) and spaced throughout the film. The textile fiberglass fibers, preferably from less than 12.7 mm to about 127 mm in length and greater than 5 microns in diameter, are combined to form an acoustic insulation mat 12. And, although it is within the scope of this invention to use flame attenuated or rotary fiberglass strands, it is preferable to use textile fiberglass which is more durable, less irritable, more economical and therefore preferred in a plurality of applications including for instance the automotive industry. The acoustical insulation mat 12 may also include recycled scrap nylon and resins as co-binders for holding the fiberglass particles in mat form. When the acoustical insulation mat 12 is formed of fiberglass, the mat 12 is typically a good acoustical insulator for frequency ranges above about 2500 hertz (Hz) but is not as effective at frequencies below 2500 Hz. One such mat is described in U.S. Pat. No. 5,883,020 issued to Bargo et al.

In the manufacture of a product of the present invention, a fiber-binder complex mix is formed and a sheet of porous polyolefin film or polyfilm 14 is stretched over a planar section of the insulation mat 12 and slightly preheated to at least about 220 degrees Fahrenheit, for a polyethylene, to tack the mat 12 and polyfilm 14 together. However, various other temperatures may be utilized to secure the polyfilm 12 to the insulation mat 12 prior to molding or curing. The face cloth 18 may also be added before the tacking occurs. The porous polyfilm 14 is comprised of a polyolefin, particularly polyethylene or polypropylene, which bonds to the fiberglass acoustic insulation 12 by application of heat and may be applied to a face, a backing, or both depending on the desired sound characteristics. Application of heat and pressure stretches the polyfilm 14 resulting in multiple varying densities throughout the polyfilm 14. The multiple varying densities enhance the ability of the polyfilm 14 to resonate at varying frequencies and therefore absorb more acoustical energy. In accordance with a preferred embodiment, the polyfilm 14 is positioned on the insulation mat 12 and facing a sound source. The porous polyfilm 14 has at least one acoustical flow-through opening between about 0.25 percent and 50.0 percent of the total surface area of the polyfilm 14. Preferably, the total surface area of the at least one acoustical flow-through opening 16 is formed by a plurality of small acoustical flow-through openings 16 which, when combined, make up a total open area of between about 0.25 and 50.0 percent of the surface area of the acoustical insulation laminate 10 after molding. The plurality of acoustical flow-through openings 16 may be in a spaced configuration and the initial openings 16, prior to molding, may be a plurality of shapes for example square, circular, or slits. The polyfilm 14 may vary in thickness ranging from 0.2 mil to 20 mils and may also vary in weight to absorb various ranges of frequencies. The porous polyfilm 14 may be between 0.5 and 40.0 percent by weight of the laminate 10.

Figure 3:
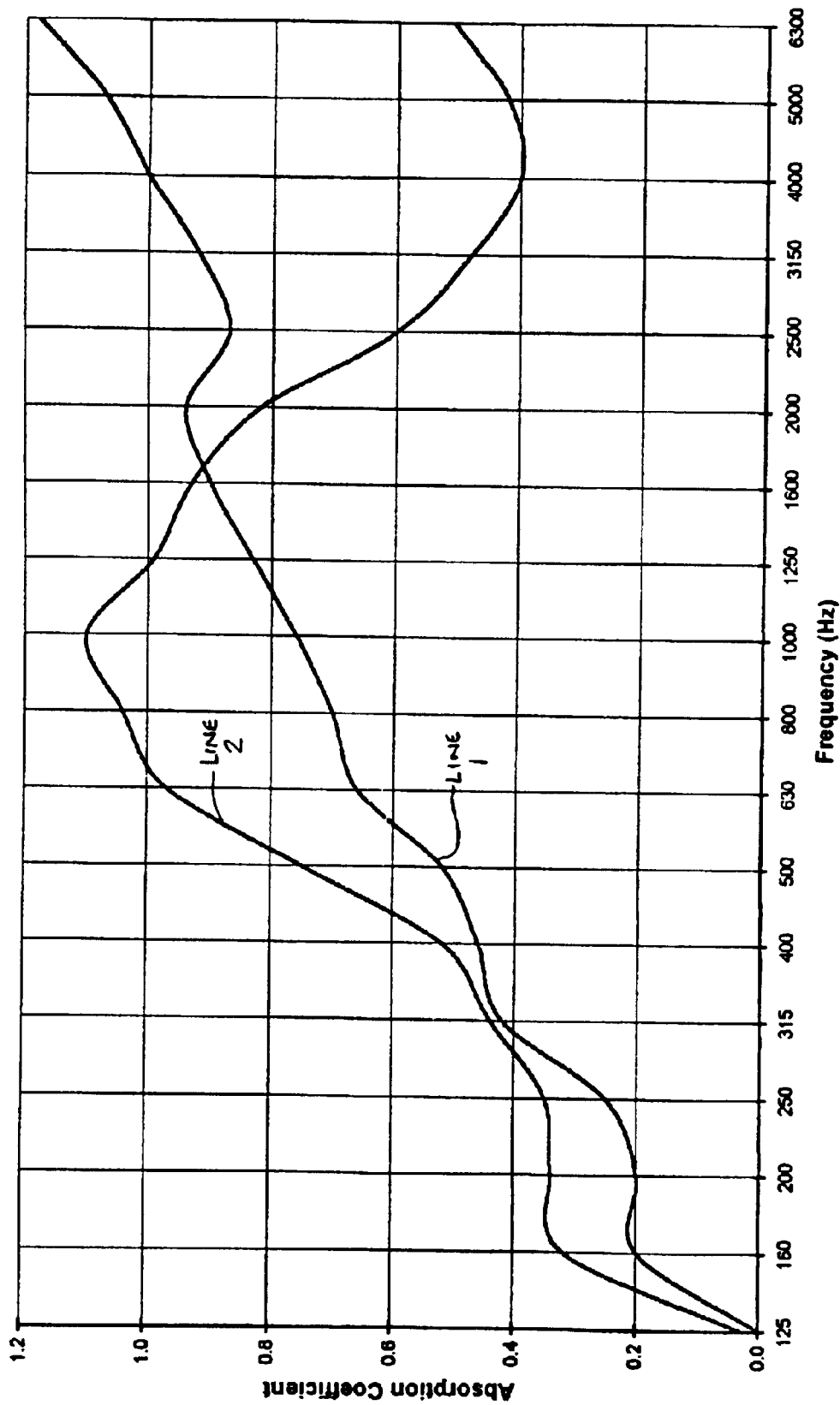

In accordance with one embodiment of the instant invention, the porous polyfilm 14 absorbs frequencies below about 2500 Hz better than the insulation mat 12 alone and, when used in combination with the sound absorbing material, the laminate 10 raises the total noise reduction coefficient as compared to insulation mat alone. As shown in FIG. 3, a chart is depicted showing a comparison of frequency versus absorption coefficient for two acoustical materials. Line 1 represents coefficient of absorption of the fiberglass insulation alone while line 2 represents the fiberglass insulation with the porous polyfilm 14 applied thereto. As discussed above it is desirable to absorb more sound having a frequency less than about 2500 Hz. This is represented as an increase in the coefficient of absorption along the vertical line of the chart. By adding the polyfilm 14 to the fiberglass insulation, line 2 of the chart shows an increase in absorption between about 125 Hz and 2500 Hz. In this example, the fiberglass mat is approximately 23.4 millimeters in thickness, the polyfilm is a polyethylene film with an initial thickness of about 2 mils prior to molding, and the apertures in the film initially have a cross-sectional area of about 0.10 to 25.4 square millimeters (mm$^2$). The acoustical flow-through apertures 16 are distributed over the film, initially taking up between approximately 0.25 and 15 percent of the surface area of the film. Larger openings grow less than smaller openings during curing or molding and the individual growth percentages are affected by the position of the film 14 in the mold and the stress on the film 14. After curing or molding, the apertures 16 may grow individually in stress relieving directions between about 0 and 600 percent such that the percentage of total opening of the surface area of the film 14 is between about 1.75 and 15 percent. However, this growth percentage is exemplary and may vary to other ranges. By changing the surface area of the flow-through openings 16, the ratio of the openings to the solid film 14, and the thickness of the polyfilm 14, the coefficient of absorption may vary for frequencies both greater and less than 2500 Hz. Moreover, by changing the weight and thickness of the laminate 10, the absorption characteristics may be adjusted to absorb desired frequencies. Finally, it should be understood by one of ordinary skill in the art that the porous polyfilm 14 may be used with any sound absorbent material including fiberglass, cotton, synthetics, cotton-synthetic blends, and other acoustical absorbers which may be of the natural or man-made variety to provide equal or greater performance than the absorbent material alone.

The apertures 16 of the porous polyfilm 14 play an important role in absorbing a wide range of low frequencies with the polyfilm instead of a very specific limited range as prior art polyfilms. In forming the porous polyfilm 16, a plurality of spaced apertures 16 are placed in the polyolefin film 16. The apertures, as discussed above may be from 0.10 to 25.4 square millimeters (mm$^2$) and may be arranged in a uniformly spaced pattern. The porous polyfilm 14 is stretched over the absorbing material 12 with the application of heat which non-uniformly varies the density of the polyfilm 14 by becoming thinner and increases the area of the at least one aperture 16.

As shown in FIG. 2, a face cloth 18 may also be applied to the acoustic insulation mat 12 and polyfilm 14. The face cloth 18 may be comprised of about 70% polyester and 30% rayon, pure polyester, or various other combinations known to one of ordinary skill in the art. The face cloth 18 assists in maintaining the laminate of fiberglass 12 and polyfilm 14 together as well as improving aesthetic appearance. However, the face cloth 18 is not essential to the instant invention. The face cloth 18 may be applied with a thermosetting resin or a thermoplastic so as to adhere to the fiberglass acoustic insulation 12 and the polyfilm 14.

Once the initial flow-through openings 16 are formed, the polyfilm 14 is stretched over the acoustical insulation mat 12. Next the face cloth 18 may be applied on a front, rear, or preferably both. The porous polyfilm 14 and face cloth 18 may be heated in a curing oven, by infrared, or by a hot-rolling process to tack the polyfilm 14 insulation mat 12 and face cloth 18 together. The acoustical insulation laminate 10 is subjected to sufficient heat to at least cure and set a desired proportion of the thermo-setting resin. In the production of a cured ductliner typically using a phenolic resin binder, the temperature of the oven will range from 250 to 700 degrees Fahrenheit, depending upon the thickness and gram weight of the mat being produced. And, the acoustical insulation laminate 10 is subjected to these temperatures for a period of time sufficient to set the phenolic resin binder, which is from about 15 seconds to 4 minutes. In the production of a semi-cured laminate 10 to be further subjected to a molding operation, the temperature of the oven will range from 200 to 500 degrees Fahrenheit for from 15 seconds to 3 minutes so that the phenolic resin is only partially set. The cured or semi-cured laminate 10 leaving the curing oven may pass through a cooling chamber and then through a slitter where the slitter slits the laminate 10 into sections of a pre-selected width and length. The laminate 10 is then transferred by conveyor to storage for further use.

The acoustical laminate 10 may be formed in a plurality of ways including a hot molding and a cold molding process. In the mold operation the laminate 10 will be completely cured and set into a desired shape and thickness. In a hot molding process various combinations of the sound absorbing material 12, the porous polyfilm 14, and the face cloth 18 may be used to form a laminate. For instance, a face cloth 18 and polyfilm 14 may form a laminate, or a sound absorbing material 12 and polyfilm 14 may form a laminate, or the sound absorbing material 12, the polyfilm 14, and at least one face cloth 18, preferably two face cloths 18 may form a laminate.

Various combinations of these elements may be layered on material handling equipment such as a traditional conveyor or a roller-link chain conveyor for molding and formation of the laminate. The layering may be performed by continuously pulling the elements of laminate 10 from rolls, called roll-loading. In the alternative the laminate elements may come in pre-cut blanks in which case the laminate elements may be stacked on material handling equipment for movement into a mold cavity.

After the material is aligned, the material handling equipment indexes or advances the elements of the laminate into a mold cavity. In the alternative, the elements of the laminate may be loaded by hand into the mold cavity. In the hot molding process the mold cavity is heated to a desired temperature so that during the molding process a thermoset resin having a pre-selected activation temperature is activated. Any or all of the elements forming the laminate 10 may have the thermoset resin or a thermoplastic, or both therein so that whichever element has the lowest activation temperature is activated first when that element reaches its activation temperature. Alternatively, all of the elements of the laminate may have the same activation temperature.

Heat may be provided to the mold cavity in a plurality of methods including hot forced air provided by gas combustion, electric heat, infrared heating, radiant heating, or heated thermal fluids. The mold temperature should be higher than the desired activation temperature to account for heat loss from the mold and the like. The activation temperature of the thermoset resin may be between about 120 and 500 degrees.

Once the layered laminate elements are positioned in the mold cavity, the mold press applies pressure. Any type of mold known in the art may be used such as fluid operated preferably by hydraulics or air, rotary molds, double shuttle molds, non-shuttle molds and roll loader molds. The molding pressure may vary be at least one pound per square inch and the cycle time required in the mold may vary between about 15 seconds and 3 minutes and is determined by the density and weight of the laminate elements. The result is a laminate 10 comprising a sound absorbing material 12, a porous polyolefin film 14, and preferably at least one face cloth 18 preferably having a thickness of between about 2 and 155 millimeters.

During the curing or molding process, the application of heat causes the thermoplastic polyfilm 14 to further stretch and non-uniformly vary the density. However, since the polyfilm 14 is attached to the face cloth 18 and the absorbing material 12, distortion of the polyfilm 14 occurs at a different rate than the insulation mat 12 and face cloth 18 due to the relationship between the heat and pressure applied and the differing densities and thickness of the materials. This causes the distortion of the acoustical flow-through apertures 16 and varying polyfilm 16 densities. The result is a plurality of multiple random shaped apertures 16 which allow high frequency sounds to pass through to the absorbing material 12. In addition, the change in density increases the ability of the laminate 10 to resonate at various frequency ranges.

In the alternative, the laminate 10 may also be molded in a cold molding process. In this process, the insulation mat 12 may be produced with a thermoplastic instead of a thermoset resin. In cold molding the laminate elements are aligned and indexed or advanced by a roll-loading process, advancing of preformed blanks, or manually loaded by hand. The laminate elements are then heated to an activation temperature of between about 120 and 500 degrees Fahrenheit. Next the laminate elements are placed in a cooled mold which lowers the temperature of the thermoplastic to below the activation temperature. The mold may be cooled by ambient air, by water, or by a chiller system. Within the cooled mold pressure is applied in an amount ranging from about 1 to 100 pounds per square inch. After cold molding or hot molding the laminate 10 may be cut to any preselected size and shape.

In use the acoustical laminate 10 is placed about an enclosure where sound absorption is desired. In accordance with a preferred embodiment of the present invention, the polyolefin film 14 is placed between the sound source and the acoustic insulation mat 12. The plurality of acoustical flow through apertures 16 allow frequencies above about 2500 Hz to pass therethrough to the insulation mat 12 while many frequencies above 2500 Hz may be reflected by the polyfilm 14. Meanwhile, frequencies below about 2500 Hz, which would not be absorbed by the insulation mat 12, are absorbed by the polyfilm layer.

Even though only one preferred embodiment has been shown and described, it is apparent those products incorporating modifications and variations of the preferred embodiment will become obvious to those skilled in the art and therefore the described preferred embodiment should not be construed to be limited thereby.

I claim:

1. A process for molding an acoustic laminate, comprising the steps:
    a. layering a mat of sound absorbing material, a porous polyolefin film and at least one face cloth;
    b. indexing said sound absorbing material, said porous polyolefin film, and said face cloth into a molding cavity;
    c. molding said sound absorbing material, said porous polyolefin film, and said face cloth in said mold cavity having a pre-selected temperature and pressure to form a laminate;
    d. said pre-selected temperature and pressure varying a density of said polyolefin film and shape of at least one flow-through aperture;
    e. said molding causing each of said at least one flow-through aperture to grow from an initial size up to about 600 percent of said initial size.

2. The process of claim 1, further comprising the step of cutting said laminate.

3. The process of claim 1, said layering performed by roll-loading said sound absorbing material, said porous polyolefin film, and said face cloth.

4. The process of claim 1, said sound absorbing material, said polyolefin film, and said face cloth being pre-formed blanks.

5. The process of claim 1, said pre-selected temperature being an activation temperature of a thermoset resin.

6. The process of claim 5, said pre-selected temperature being between about 120 and 500 degrees Fahrenheit.

7. The process of claim 1, said pre-selected pressure being between about 1 and 100 pounds per square inch.

8. The process of claim 1, said molding having a cycle time being between from about 15 seconds to about 3 minutes.

9. The process of claim 1, said indexing being performed by an automated process.

10. The process of claim 1, said indexing being performed by hand.

11. A process for molding an acoustic laminate, comprising the steps:
    a. layering a sound absorbing material and a porous polyolefin film;
    b. heating a thermoplastic material, said sound absorbing material and said polyolefin film at a pre-selected temperature;
    c. applying a pre-selected pressure to said sound absorbing material and said porous polyolefin film in a cooled mold to form a laminate;
    d. said heating and said molding causing at least one flow-through aperture to grow from an initial size;
    e. each of said at least one flow through aperture growing no to about 600 percent of said initial size.

12. The process of claim 11, said cooled mold being an air-cooled mold.

13. The process of claim 11, said cooled mold being a chilled mold.

14. The process of claim 11, including the step of lowering a temperature of said thermoplastic below said activation temperature.

15. The process of claim 11, said pre-selected pressure being between about 1 and 100 psi.

16. The process of claim 11, said activation temperature being between about 120 and 500 degrees.

17. The process of claim 11, said layering performed by roll-loading said sound absorbing material and said polyolefin film.

18. The process of claim 11, said sound absorbing material and said polyolefin film, and a face cloth being layered by stacking pre-formed blanks.

19. A process for molding an acoustic laminate, comprising the steps:
    a. layering a face clot and a polyolefin film;
    b. heating a thermoplastic material with said face cloth and said polyolefin film to a pre-selected activation temperature;
    c. cooling said face cloth, said polyolefin film, and said thermoplastic under a pre-selected pressure to form a laminate;
    d. said heating and said pre-selected pressure varying the density of said polyolefin film and shape of at least one flow-through aperture;
    e. said heating and said preselected pressure causing said at least one flow through aperture to grow from an initial size;

f. each of said at least one flow through aperture growing up to about 600 percent of said initial size.

20. The process of claim 19, said layering performed by roll-loading said sound absorbing material and said polyolefin film.

21. The process of claim 19, said sound absorbing material and said polyolefin film, and said face cloth being layered by stacking pre-formed blanks.

22. The process of claim 19, cooling said thermoplastic below said activation temperature in a cooled mold.

23. The process of claim 19, paid cooled mold being air cooled.

24. The process of claim 19, said cooled mold being chilled.

25. The process of claim 19, said face cloth, said polyolefin film and said thermoplastic being molded for a period of time from about 15 seconds to about 3 minutes.

26. The process of claim 19, said pre-selected pressure being between 1 and 100 pounds per square inch.

27. The process of claim 19, said activation temperature being between 120 and 500 degrees Fahrenheit.

28. The process of claim 19 further comprising the step of cutting the molded laminate to a pre-selected geometry.

29. The process of claim 28, said cutting of said laminate being performed with a high pressure liquid cutter.

30. The process of claim 19, further comprising the step of rolling the laminate into a shippable roll.

31. A process for molding an acoustic laminate, comprising the steps:
 a. layering a face cloth, a porous polyolefin film, and a sound absorbing material;
 b. heating a thermoplastic material to a pre-selected activation temperature;
 c. cooling said thermoplastic material, said face cloth, said porous polyolefin film, and said sound absorbing material below said activation temperature under a pre-selected pressure to form a laminate;
 d. said pre-selected pressure and temperature varying the density of said polyolefin film and shape of at least one flow-through aperture therein;
 e. said molding causing said at least one flow-through aperture to grow from an initial size, each of said at least one flow through aperture growing up to about 600 percent of said initial size.

32. The process of claim 31, further comprising the step of cutting the laminate to a pre-selected geometry.

33. The process of claim 32, further comprising the step of rolling the laminate into a shippable roll.

34. The process of claim 31, said pre-selected activation temperature being between about 120 and 500 degrees Fahrenheit.

35. The process of claim 31, said pre-selected pressure being between about 1 and 100 pounds per square inch.

36. The process of claim 31, said pre-selected pressure applied by a cooled mold.

37. The process of claim 36, said cooled mold being a chilled mold.

38. The process of claim 36, said cooled mold being an air cooled mold.

39. The process of claim 31, said heating performed by a forced air heat source.

40. The process of claim 31, said heating performed by a radiant heat source.

41. The process of claim 31, said heating performed by an infra-red heat source.

42. A process for molding an acoustic laminate, comprising the steps:
 a. heating a blank comprising a sound absorbing material and a polyolefin film at a pre-selected temperature during a first molding step;
 b. applying a pre-selected pressure to said blank in a cooled mold to form a laminate during a second molding step;
 c. said molding causing at least one flow-through aperture to grow from an initial size;
 d. each of said at least one flow through aperture growing up to about 600 percent of said initial size.

43. The process of claim 42 wherein the total percentage of surface area openings after molding is between about 1.75 percent and about 15 percent.

44. A process for molding an acoustic laminate, comprising the steps:
 a. forming a blank of a sound absorbing material and a porous polyolefin film including at least one flow-through aperture;
 b. loading said blank into a molding cavity;
 c. molding said blank in said mold cavity having a pre-selected temperature and pressure to form a laminate;
 d. said pre-selected temperature and pressure varying a density of said polyolefin film and shape of said at least one flow-through aperture and causing each of said at least one flow-through aperture to grow from an initial size up to about 600 percent of said initial size.

* * * * *